(12) United States Patent
Gogo (10) Patent No.: US 6,722,461 B2
(45) Date of Patent: Apr. 20, 2004

(54) REAR SUSPENSION ATTACHING STRUCTURE OF MOTORCYCLE

(75) Inventor: Kazuhiko Gogo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 133 days.

(21) Appl. No.: 10/102,873

(22) Filed: Mar. 22, 2002

(65) Prior Publication Data

US 2002/0144850 A1 Oct. 10, 2002

(30) Foreign Application Priority Data

Apr. 4, 2001 (JP) ........................................ 2001-105335

(51) Int. Cl.$^7$ .............................................. B62K 11/00
(52) U.S. Cl. ...................................... 180/227; 280/283
(58) Field of Search ................................ 180/219, 227; 280/283–286; 188/321.11

(56) References Cited

U.S. PATENT DOCUMENTS

| | | | | |
|---|---|---|---|---|
| 2,819,064 A | * | 1/1958 | Peras .......................... 267/64.15 |
| 4,076,271 A | * | 2/1978 | Doncque ........................ 280/284 |
| 4,322,088 A | * | 3/1982 | Miyakoshi et al. ........... 280/284 |
| 4,440,413 A | * | 4/1984 | Miyakoshi et al. ........... 280/284 |
| 4,515,236 A | * | 5/1985 | Kanamori ..................... 180/227 |
| 4,523,659 A | * | 6/1985 | Yamamoto et al. ........... 180/227 |
| 4,712,638 A | * | 12/1987 | Kawaguchi et al. ......... 180/219 |
| 5,062,495 A | * | 11/1991 | Padgett ......................... 180/227 |
| 5,957,473 A | * | 9/1999 | Lawwill ........................ 280/284 |
| 6,076,845 A | * | 6/2000 | Lawwill et al. ............... 280/284 |
| 6,102,421 A | * | 8/2000 | Lawwill et al. ............... 280/284 |
| 6,595,310 B2 | * | 7/2003 | Gogo ............................ 180/219 |

FOREIGN PATENT DOCUMENTS

| | | |
|---|---|---|
| GB | 2 142 591 A | 1/1985 |
| JP | 60-094808 A | 5/1985 |

* cited by examiner

Primary Examiner—Lesley D. Morris
Assistant Examiner—Paul Royal, Jr.
(74) Attorney, Agent, or Firm—Birch, Stewart, Kolasch & Birch, LLP (57) ABSTRACT

An interval between an attachment portion of a rear shock absorber on a side of a swing arm and an attachment portion thereof on a side of a vehicle body can be reduced with the present invention. When the rear shock absorber is attached between the swing arm and the vehicle body side, a new space can be formed at an area surrounding an end portion of the rear shock absorber. One end of the swing arm is swingably attached to a pivotal shaft provided at a power unit. A rear wheel is attached to other end of the swing arm. A side face of a cylinder portion of the rear shock absorber is attached to the swing arm via an attachment member and a lower end of the rear shock absorber is attached to the power unit.

19 Claims, 10 Drawing Sheets

REAR SUSPENSION ATTACHING STRUCTURE OF MOTORCYCLE

CROSS-REFERENCES TO RELATED APPLICATIONS

This nonprovisional application claims priority under 35 U.S.C. § 119(a) on Patent Application No. 2001-105335 filed in Japan on Apr. 4, 2001, the entirety of which is herein incorporated by reference.

BACKGROUND OF THE INVENTION

1. Field of the Invention

The present invention relates to a rear suspension attachment structure for a motorcycle, and more particularly to a rear suspension attachment structure providing increasing degrees of freedom of design shape, dimension, an attachment position or the like of a contiguous part. The present invention narrows an interval of an attachment portion while maintaining a stroke amount of a shock absorbing member and concentrating parts at an end portion of the shock absorbing member.

2. Description of the Background Art

Figure 10:
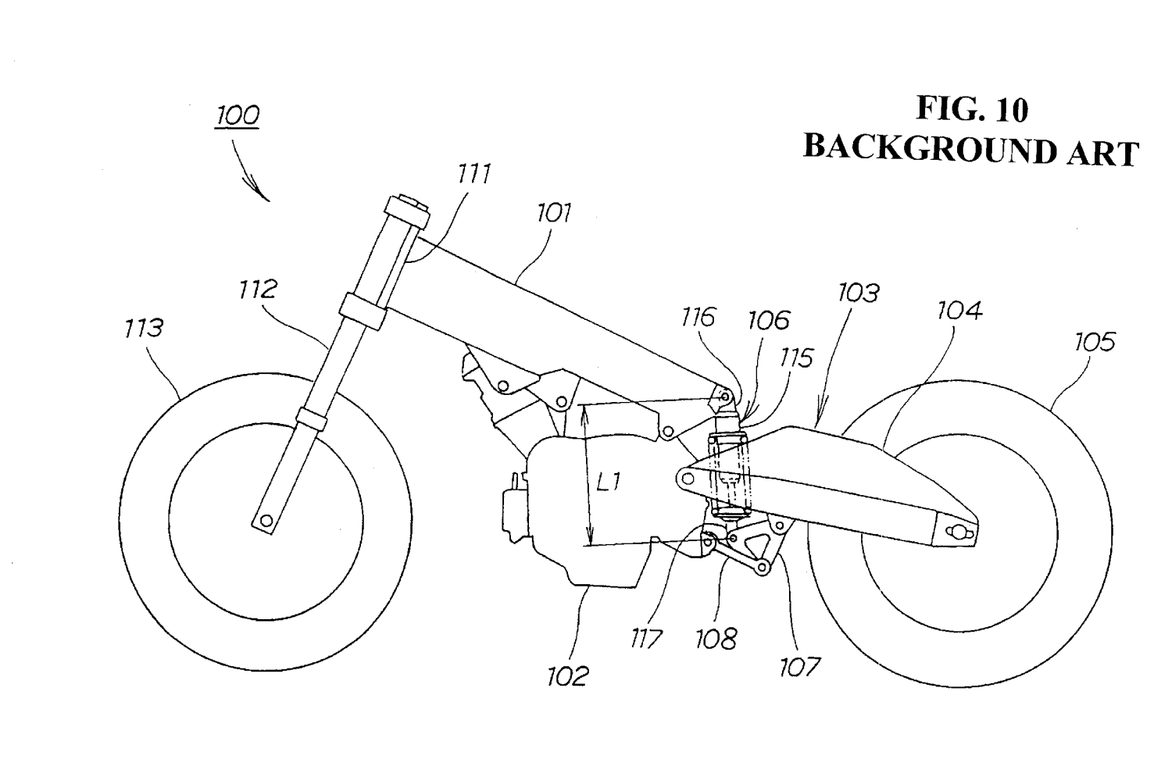
FIG. 10 is a side view of a vehicle of the background art incorporating a conventional rear suspension attachment structure.

FIG. 10 is a side view of a vehicle of the background art incorporating a conventional rear suspension attachment structure. In FIG. 10, a vehicle 100 having a conventional rear suspension 103, a power unit 102 constituted by an engine and a transmission attached to a lower portion of a vehicle body frame 101 of the vehicle 100 is shown. The rear suspension 103 is arranged at rear portions of the vehicle body frame 101 and the power unit 102.

The rear suspension 103 includes a swing arm 104 swingably attached to the rear portion of the power unit 102, a rear wheel 105 attached to a rear end of the swing arm 104, and one end of a shock absorber 106 attached to the rear portion of the vehicle body frame 101. A first link member 107 is attached to the swing arm 104 and is connected to other end of the shock absorber 106, and a second link member 108 attached to the power unit 102 is connected to the first link member 107. The vehicle 100 also includes a head pipe 111 attached to a front end of the vehicle body frame 101, a front fork 112 rotatably attached to the head pipe 111 and a front wheel 113.

The shock absorber or shock absorbing member 106 includes a first attachment portion 116 provided at an end portion of a cylinder portion 115 to the vehicle body frame 101 and a second attachment portion 117 provided at an other end thereof to the first link member 107. The shock absorber 107 includes a stroke amount that effects the length of an interval L1, e.g., an interval L1 between the first attachment portion 116 and the second attachment portion 117 of the shock absorber 106. When a necessary amount of stroke of the shock absorber 106 effecting influence on running performance and ride quality of the vehicle 100 is enlarged, e.g. the interval L1 is increased, a position of the first attachment portion 116 is ultimately raised to a position higher with respect to the vehicle frame.

Accordingly, shapes and attachment positions of a seat, a fuel tank and the like arranged on an upper side of the vehicle frame are undesirably restricted. Alternatively, a position of the second attachment portion 117 is lowered and lengths and attachment positions of the first and the second link members 107 and 108 arranged on a lower side are also restricted. Further, it is difficult to arrange other parts in positions surrounding the first and the second attachment portions 116 and 117 of the shock absorber 106.

SUMMARY OF THE INVENTION

The present invention overcomes the shortcomings associated with the background art and achieves other advantages not realized by the background art.

An aspect of the present invention is to provide a rear suspension attachment structure that narrows an interval between attachment positions for a rear shock absorber or shock absorber.

An aspect of the present invention is to increase the degree of freedom of vehicle frame and rear suspension design with respect to shape, dimension, an attachment position or the like of part(s) contiguous to an end portion of the rear shock absorber and rear suspension of a vehicle such as a motorcycle.

These and other aspects of the present invention are accomplished by a rear suspension attachment structure for a motorcycle having a vehicle body, the vehicle body including a rear wheel and a power unit, the rear suspension attachment structure comprising a swing arm having first end and a second end, the first end being swingably attached to a pivotal shaft provided on the vehicle body and the second end being attached to the rear wheel; a shock absorber having a cylinder and a lower end, the cylinder including a side face, the lower end of the rear shock absorber being connected to the side of the vehicle body; and an attachment member, the side face of the cylinder of the rear shock absorber being attached to the swing arm via the attachment member.

These and other aspects of the present invention are accomplished by a rear suspension attachment structure for a vehicle comprising a swing arm, said swing arm having a generally trapezoidal shape with a middle portion, a first swing arm end and a second swing arm end; a rear shock absorber having an upper end and a lower end; at least one upper bracket for said swing arm, said upper end of said rear shock absorber being attached to the middle portion of the swing arm at said at least one upper bracket; at least one lower bracket for said swing arm; and a link mechanism being attached to said swing arm by said at least one lower bracket.

According to a rear suspension attachment structure of the present invention, one end of a swing arm is swingably attached to a pivotal shaft provided on a side of a vehicle body and a rear wheel is attached to other end of the swing arm. A side face of a cylinder of a rear shock absorber is attached to the swing arm via an attachment member and a lower end of the rear shock absorber is connected to the side of the vehicle body. Accordingly, an interval between an attachment portion of the rear shock absorber on a side of the swing arm and an attachment portion thereof on a side of the vehicle body when the rear shock absorber is attached between the swing arm and side of the vehicle body can be reduced. A new space can also be formed at an area surrounding an end portion of the rear shock absorber.

Therefore, the degrees of freedom of shape, dimension and attachment positions of contiguous parts to the end portion of the rear shock absorber can be desirably increased. Further, additional/alternative parts can be arranged at the area surrounding the end portion of the rear shock absorber 34.

A male screw can be formed at the side face of the cylinder and coupled with a female screw portion formed at the attachment member. Accordingly, by rotating the cylinder, the cylinder can be moved in a direction of the extension of a cylinder axis relative to the attachment member. An interval between the attachment portion of the rear cushion on the side of the swing arm and the attachment portion of the rear cushion on the side of the vehicle body can be changed and a position on the side of the vehicle body can be moved upwardly and downwardly as desired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. Further, the drawings will be described hereinafter with reference to the directions of notation shown and/or in relation to the vehicle frame.

Figure 1:
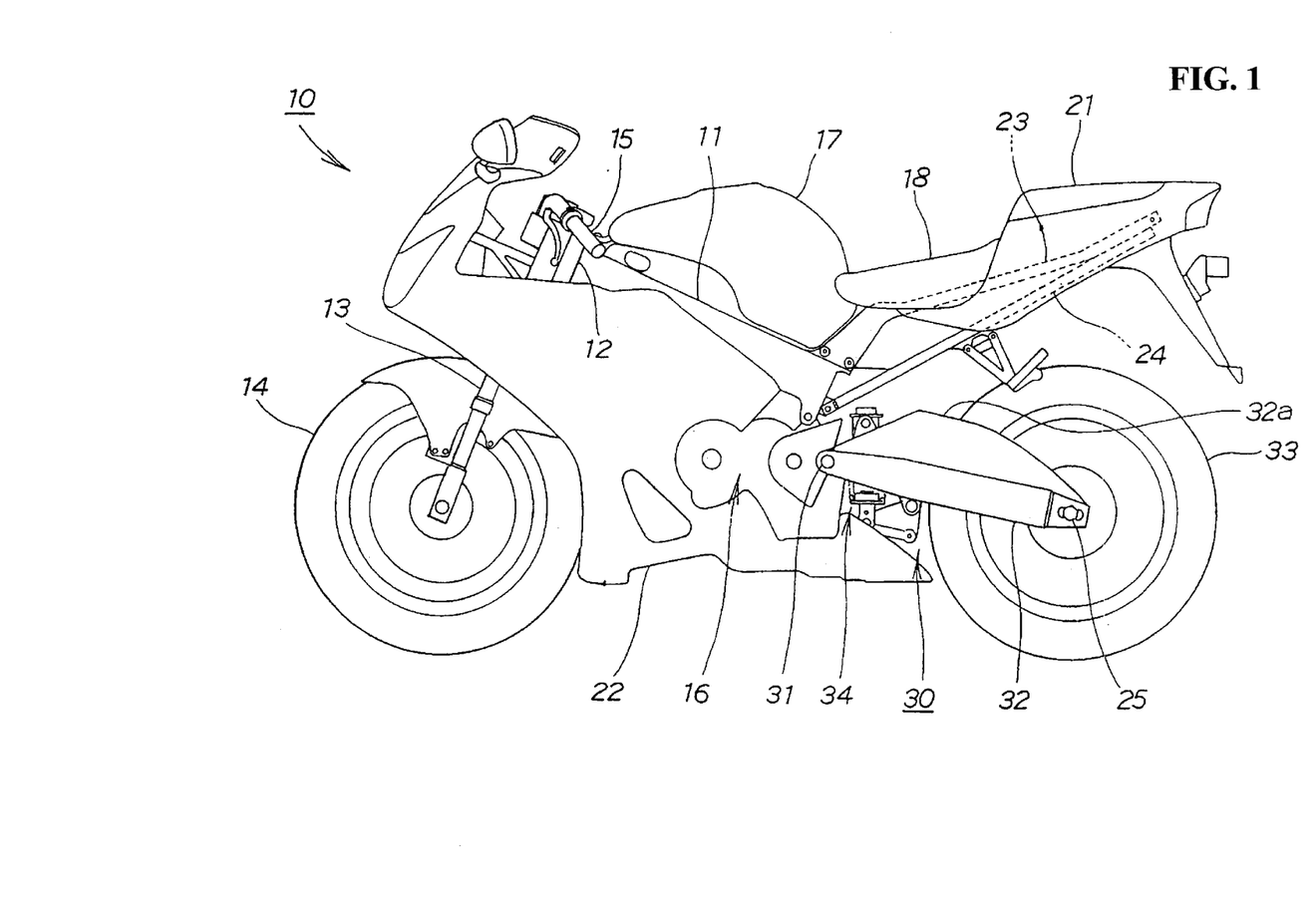
FIG. 1 is a side view of a motorcycle having a rear suspension attachment structure according to a first embodiment of the present invention.

FIG. 1 is a side view of a motorcycle having a rear suspension attachment structure according to a first embodiment of the present invention. FIG. 1 is a side view of a motorcycle 10 adopting a rear suspension 30 attachment structure according to the first embodiment. The motorcycle 10 includes a front fork 13 steerably attached to a main frame 11 and a head pipe 12 provided at a front end portion of the main frame 11. A front wheel 14 is attached to a lower end of the front fork 13 and a steering handlebar 15 is attached to an upper portion of the front fork 13. A power unit 16 constituted by an engine and a transmission is attached to a lower portion of the main frame 11, a rear suspension 30 is attached to a rear portion of the power unit 16, and a fuel tank 17 is attached to an upper portion of the main frame 11. Seats 18 and 21 are arranged on a rear side of the fuel tank 17. Further, the motorcycle 10 may include a cowling 22, a seat frame 23, a sub frame 24 extended from a rear portion of the main frame 11 in a rear skewed upper direction, and a rear wheel shaft 25.

The rear suspension 30 includes a pivotal shaft 31 provided at a rear portion of the power unit 16. A front end of a swing arm 32 is pivotably attached to the pivotal shaft 31 and a rear wheel 33 is attached to a rear end of the swing arm 32. An upper end of a rear shock absorber or shock absorbing member (hereinafter shock absorber) 34 is attached at a vicinity of the pivotal shaft 31 of the swing arm 32. The shock absorber 34 is provided for absorbing impact and preventing the impact from being propagated to the vehicle body via the rear wheel 33 and the swing arm 32. A lower end of the shock absorber unit 34 is attached to a lower portion of the power unit 32 via a link mechanism (described in greater detail hereinafter).

The swing arm 32 is a member formed with a generally trapezoidally-shaped portion 32a in which a central portion in the longitudinal direction of an upper portion thereof is heightened with respect to end portions thereof. The upper end of the rear shock absorber 34 is attached to a middle portion of the trapezoidally-shaped portion 32a between a first end portion and the central portion, e.g. forward of the central portion in the longitudinal direction of the trapezoidally-shaped portion 32a.

Figure 2:
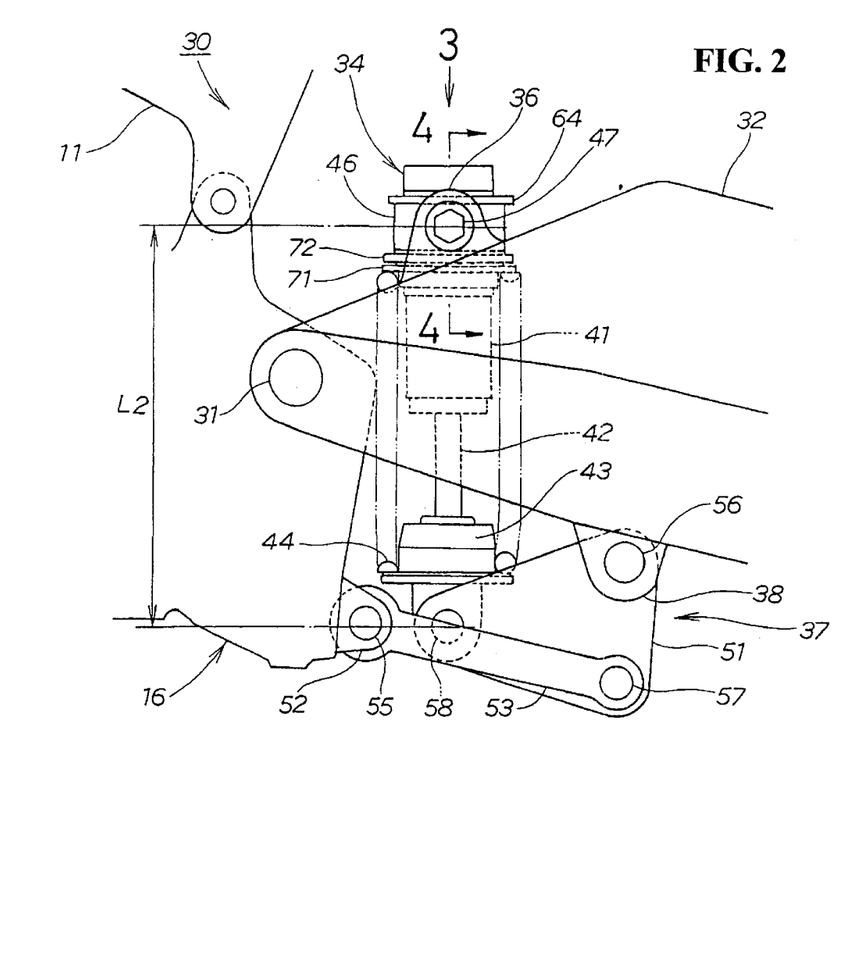
FIG. 2 is a partial, side view showing a portion of the rear suspension attachment structure according to the first embodiment of the present invention.

FIG. 2 is a partial, side view showing a portion of the rear suspension attachment structure according to the first embodiment of the present invention. The swing arm 32 is provided with upper brackets 36, 36 (the upper bracket 36 on the far side, e.g. on the right side of the vehicle 100 shown in FIG. 1, is not shown) for attachment of the rear shock absorber 34 at an upper portion thereof. The swing arm 32 is also provided with lower brackets 38, 38 (the lower bracket 38 on the far side is not shown) for attachment of a link mechanism 37 at a lower portion thereof.

The rear shock absorber 34 includes a cylinder portion 41 having a cylinder, a piston rod 42 attached to a piston (not shown) movably contained in the cylinder portion 41, a lower end attachment portion 43 provided at an end portion of the piston rod 42 and a suspension spring 44 interposed between respective sides of the cylinder portion 41 and the lower end attachment portion 43. The rear shock absorber also includes a cylinder attachment member 46 having an attachment member coupled, e.g. by screws, to a side face of the cylinder portion 41 and swingably attached to the upper brackets 36 of the swing arm 32. The lower end attachment portion 43 is attached to the link mechanism 37. Further, upper attachment bolts 47, 47 (bolt on the far side is not shown) form a swing shaft of the cylinder attachment member 46.

The link mechanism 37 includes a first link 51 having a triangular shape (as viewed in a side view) swingably attached to the lower brackets 38 of the swing arm 32, and a second link 53. One end of the second link 53 is swingably attached to the first link 51 which is swingably attached to a link attachment portion 52 provided at a lower portion of the power unit 16. A swing shaft 55 is provided on the side of the power unit.

The first link 51 is connected to the lower brackets 38 of the swing arm 32 by a first shaft 56 and is connected to the second link 52 by a second shaft 57. The first link 51 is also connected to the lower end attachment portion 43 of the rear shock absorber unit 34 by a third pivotal shaft 58. The power unit swing shaft 55 is a shaft disposed on a lower side of the pivotal shaft 31. An interval L2 between the upper portion attachment bolt 47 and the third shaft 58 is shown in FIG. 2.

Figure 3:
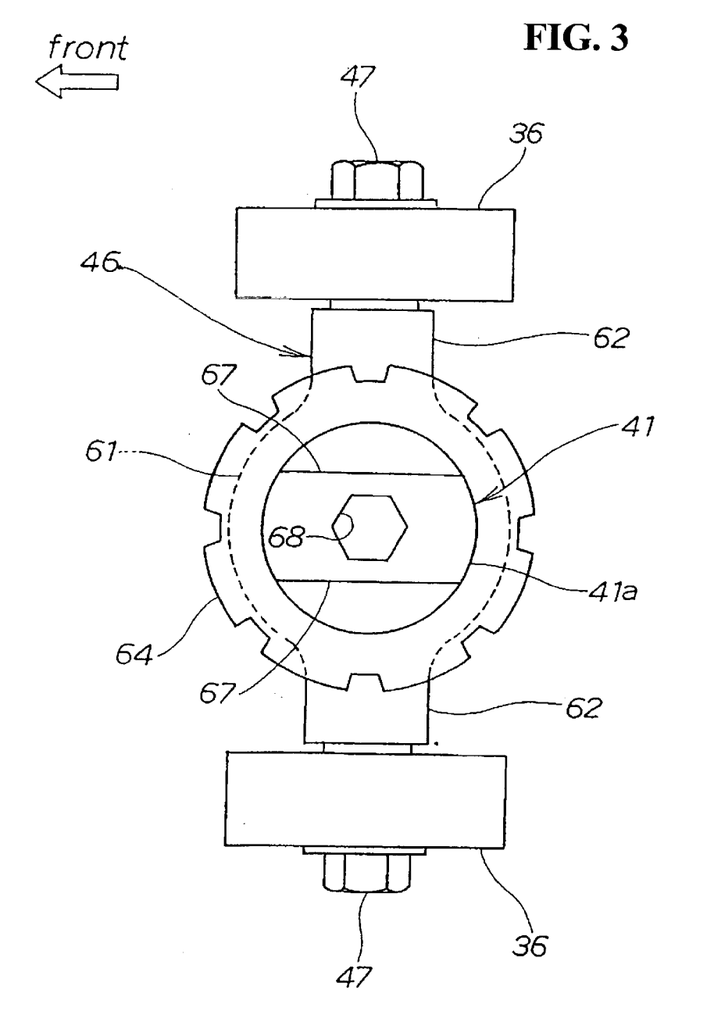
FIG. 3 is a side view taken along arrow mark 3 in FIG. 2.

FIG. 3 is a side view taken along arrow mark 3 in FIG. 2. A hollow (white) arrow mark (labeled front) designates a front or forward direction of the vehicle. The cylinder attachment member 46 includes a circular ring portion 61 provided at a center thereof and arm portions 62, 62 extended from the circular ring portion 61 to the left and to the right. The circular ring portion 61 is coupled, e.g., by screws, to a side face 41a of the cylinder portion 41 and the arm portions 62, 62 are attached to the upper brackets 36, 36 of the swing arm 32 by the upper portion attachment bolts 47, 47, respectively.

Figure 4:
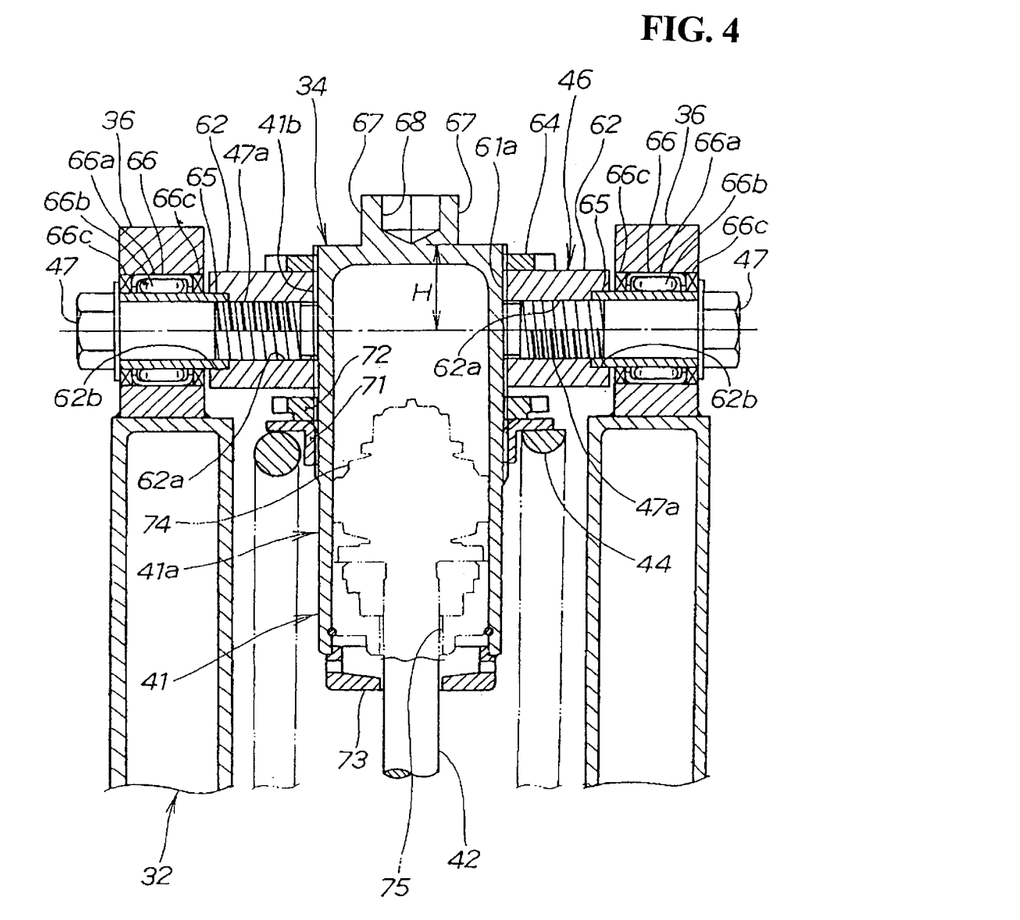
FIG. 4 is a partial, sectional view taken along line 4—4 of FIG. 2.

FIG. 4 is a partial, sectional view taken along line 4—4 of FIG. 2. FIG. 4 shows a state in which a male screw portion 41b is formed with a male screw at the side face 41a of the cylinder portion 41 of the rear shock absorber 34. A female screw portion 61a is formed with a female screw at the circular ring portion 61 (refer to FIG. 3) of the cylinder attachment member 46. The female screw portion 61 a is screw-coupled to the male screw portion 41b. A pivotal movement of the cylinder portion 41 is stopped by a lock nut 64, and the arm portions 62, 62 of the cylinder attachment member 46 are attached to the upper brackets 36, 36 of the swing arm 32 by the upper attachment bolts 47 and 47.

The cylinder attachment member 46 is formed with a female screw portion 62a and a large diameter hole 62b larger than an inner diameter of the female screw portion 62a at the arm portion 62. According to the upper attachment bolt 47, a male screw portion 47a is screw-coupled to the female screw portion 62a and the upper attachment bolt 47 is rotatably attached to the upper bracket 36 via a collar 65 and a needle roller bearing 66. An end portion of the collar 65 is inserted into the large diameter hole 62b.

The needle roller bearing 66 includes an outer ring 66a and a plurality of needle rollers 66b provided on an inner side of the outer ring 66a. Further, dust seals 66c, 66c prevent earth and sand, rain water or the like from entering into the roller bearing 66. A height H from the center of the upper attachment bolt 47 to an end portion of the cylinder portion 41 and the upper attachment bolt 47 can be arranged on the lower side of the end portion of the cylinder portion 41.

Here, spanner land portions 67,67 constituted by parallel faces for engaging a spanner wrench and a hexagonal hole 68 for inserting a hexagonal wrench are provided. By loosening the lock nut 64, rotating the cylinder portion 41 relative to the cylinder attachment member 46 with a spanner engaged with the spanner land portions 67, 67 or with a hexagonal wrench inserted into the hexagonal hole 68, and moving the cylinder portion 41 in a direction of the extension of the cylinder shaft (e.g., in an up and down direction of the drawing in FIG. 2), the lower brackets 38 can be moved upwardly and downwardly via the lower end attachment portion 43 of the rear shock absorber 34 and the first link 51.

For example, when the cylinder portion 41 is elevated along the cylinder axis, the lower brackets 38 are elevated relative to the pivotal shaft 31 and a rear downward angle of the swing arm 32 is reduced. Therefore, in FIG. 1, the pivotal shaft 31 is lowered relative to the rear wheel shaft 25 and the seat 18 of a rider is lowered.

For example, as seen in FIG. 2, when the cylinder portion 41 is lowered along the cylinder shaft, the lower brackets 38 are lowered relative to the pivotal shaft 31 and therefore, the rear downward angle of the swing arm 32 is increased. Therefore, in FIG. 1, the pivotal shaft 31 is elevated relative to the rear wheel shaft 25 and the seat 28 of the rider is elevated. By adjusting the position of the seat 18 in this way, a difference in physical configuration or rider comfort can be addressed.

Referring back to FIG. 4, a spring support member 71 coupled by screws to the main screw portion 41b of the cylinder portion 41 supports an end of the suspension spring 44. A lock nut 72 stops pivotal movement of the spring support member 71. A cap 73 closes an opening of the cylinder portion 41. A piston 74 is movably inserted into the cylinder portion 41 and a rod guide 75 is provided at an end portion of the cylinder portion 41 for guiding the piston rod 42.

Figure 5:
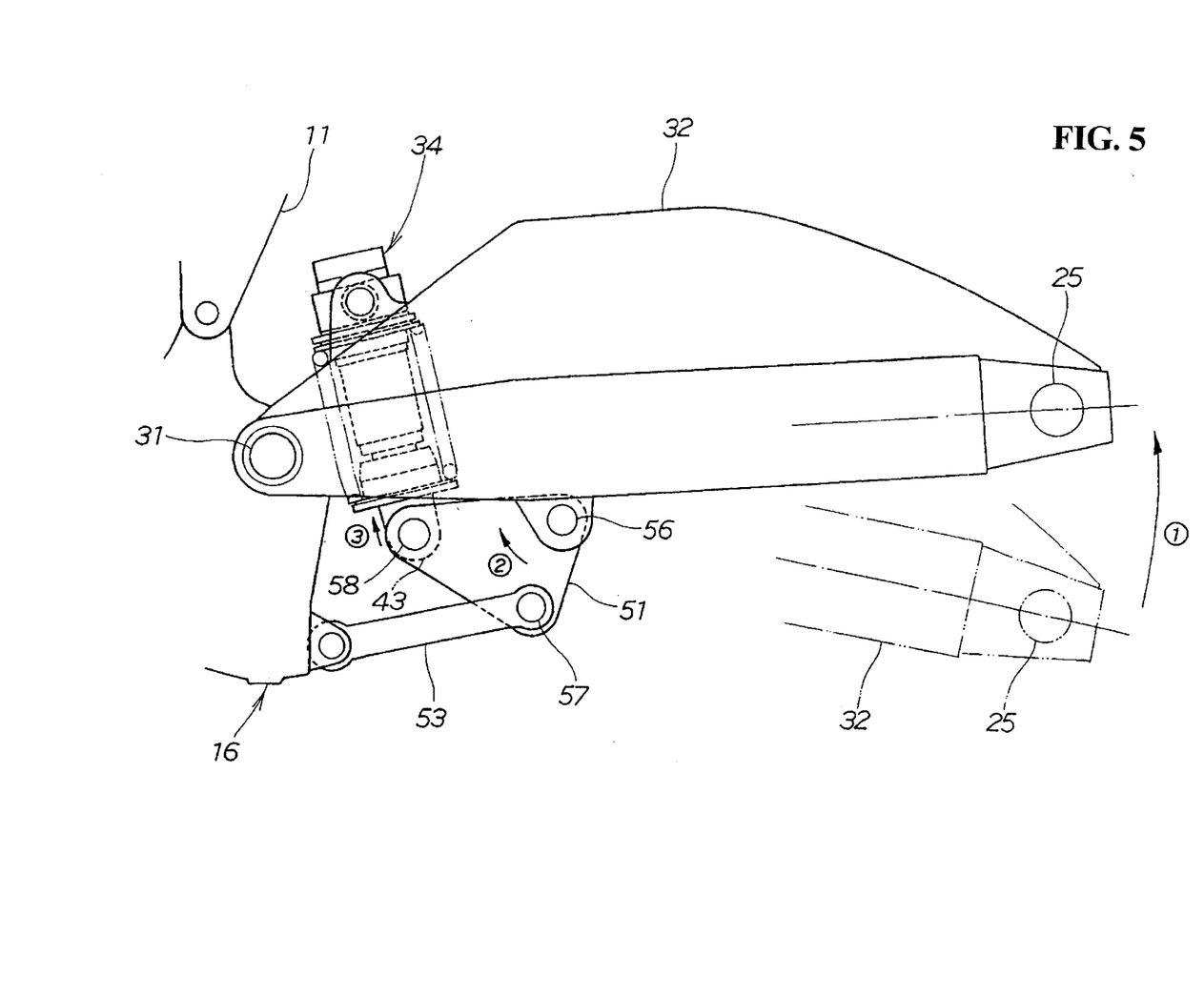
FIG. 5 is a side view of the rear suspension attachment structure according to the first embodiment of the present invention detailing operational positioning.

An explanation will be given of the operation of the above-described rear suspension 30 hereinafter. FIG. 5 is a side view of the rear suspension attachment structure according to the first embodiment of the present invention detailing operational positioning.

In FIG. 1, for example, when the motorcycle 10 rides over a projected or uneven portion on a road surface, the rear wheel 33 is moved upwardly relative to the vehicle body side (main frame 11 and power unit 16). As seen in FIG. 5, the swing arm 32 is swung upwardly from a position shown by imaginary lines to a position shown by bold lines centering on the pivotal shaft 31 in the direction of arrow mark 1. The first link 51 is swung centering on the first shaft 56 in the clockwise direction, e.g., as shown by an arrow mark 2. Accordingly, the lower end attachment portion 43 attached to the third shaft 58 is lifted as shown by an arrow mark 3. The rear shock absorber unit 34 produces an attenuating force while being contracted to thereby absorb any impact.

Figure 6:
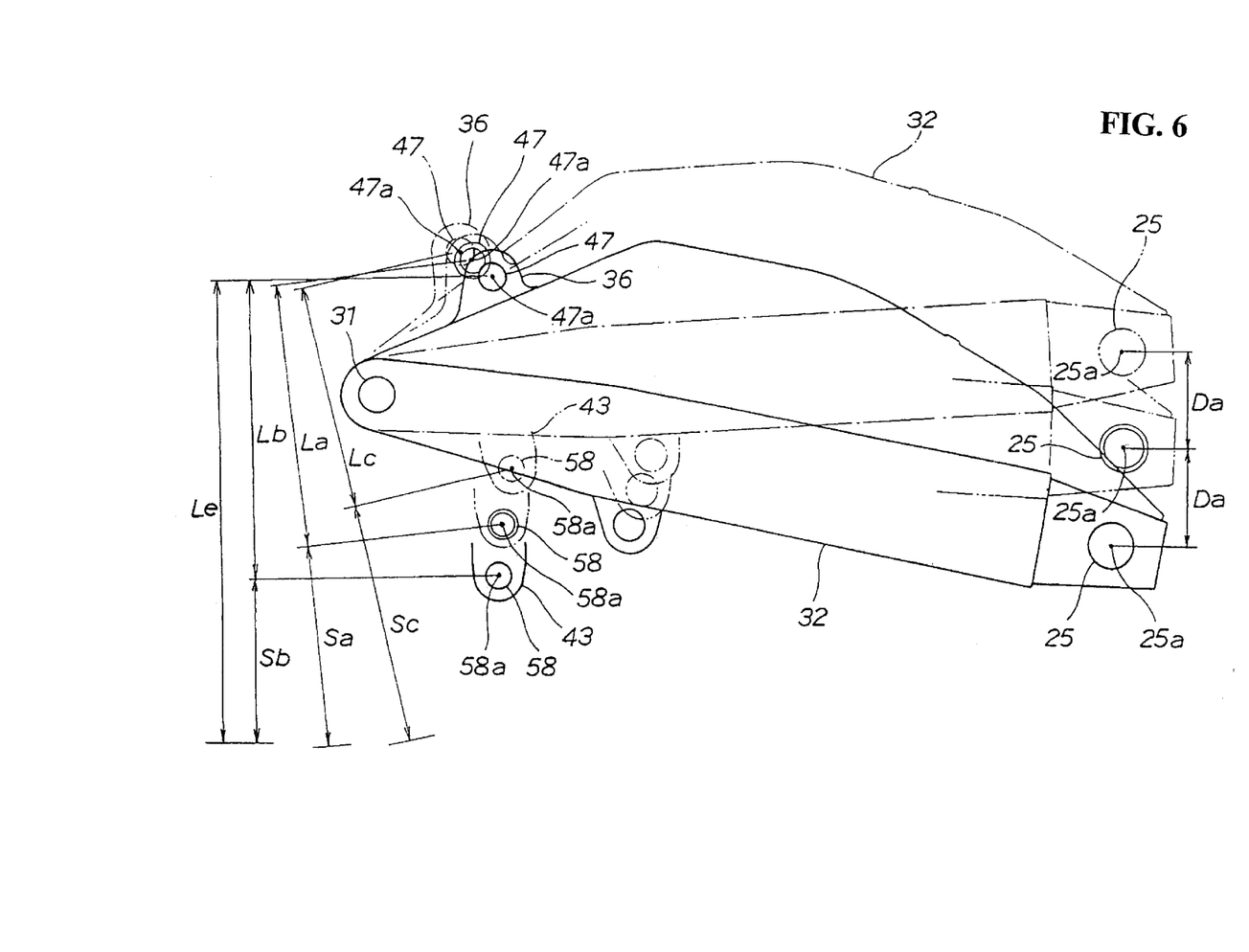
FIG. 6 is a side view of the rear suspension attachment structure according to the first embodiment of the present invention detailing operational positioning.

FIG. 6 is a side view of the rear suspension attachment structure according to the first embodiment of the present invention detailing operational positioning. FIG. 6 depicts a relationship between an amount of movement of the rear wheel shaft 25 of the swing arm 32 in the up and down direction and a stroke amount of the rear shock absorber unit 34. Further, in the drawing, a large pair of concentric circles mark (hereinafter concentric circle mark) designates the rear wheel shaft 25 and a small concentric circle mark designates the upper attachment bolt 47 and the third shaft 58.

When the rear wheel shaft 25 is disposed at a position designated by the large concentric circle mark, e.g., in a position in a state in which a rider rides on the motorcycle, the vehicle is stopped (without operating force in accelerating or decelerating the vehicle to the vehicle) and the vehicle is erected. Hereinafter, this position is described as a 'neutral riding position' (also referred to as '1G state position of riding'). This neutral riding position corresponds to neutral positions of riding of the swing arm 32 and rear wheel 33 (refer to FIG. 1). The third shaft 58 constituting a connecting shaft of the link mechanism 37 (refer to FIG. 2) and the rear shock absorber unit 34 (refer to FIG. 2) are disposed at a position designated by the concentric circle mark.

When a total length La of the shock absorber 34, e.g., a distance between an axial center 47a of the upper attachment bolt 47 and an axial center 58a of the third shaft 58, and a total length Le of the rear shock absorber 34 extended maximally, a stroke amount Sa of the rear shock absorber 34 at the neutral position of riding is designated by Sa=Le−La.

First, when the swing arm 32 is swung from the neutral position of riding to an extended side of the shock absorber 34 (swung downwardly) (refer to FIG. 2), the swing arm 32, the upper brackets 36 of the swing arm 32, the lower end attachment portion 43 of the rear shock absorber 34, the third shaft 58 and the rear wheel shaft 25 are disposed at positions designated by bold lines. A movement amount of the rear wheel shaft 25 in this case to the extended side of the rear shock absorber 34 (moving amount of an axis center 25a) is designated by notation Da. At this position, a total length of the rear shock absorber 34 is designated by notation Lb and the stroke amount is designated by notation Sb, e.g., Sb=Le−Lb.

Further, when the swing arm 32 is swung from the neutral position of riding to a contracted side of the rear shock absorber 34 (swung upwardly), the swing arm 32, the upper brackets 36 of the swing arm 32 the lower end attachment portion 43 of the rear shock absorber 34, the third shaft 58 and the rear wheel shaft 25, are disposed at positions designated by single-dotted chain lines. A movement amount of the rear wheel shaft 25 to the contracted side of the shock absorber 43, is designated by notation Da the same as that of the above-described movement amount. In this case, the total length of the rear shock absorber 34 is designated by notation Lc and the stroke amount is designated by notation Sc, e.g., Sc=Le−Lc.

According to the rear suspension 30 of the present invention (refer to FIG. 2), by using the aforementioned link mechanism 37 (refer to FIG. 2), there is established the following relationship: (Sc−Sa)>(Sa−Sb). That is, by making a stroke to the contracted side of the rear shock absorber 34 by the rear wheel shaft 25, a change in the stroke amount of the rear shock absorber 34 is increased. The more contracted the rear shock absorber 34, the more increased is the moving speed of the piston of the rear shock absorber 34 and the more increased is the resulting attenuating force produced by the rear shock absorber 34.

Figure 7:
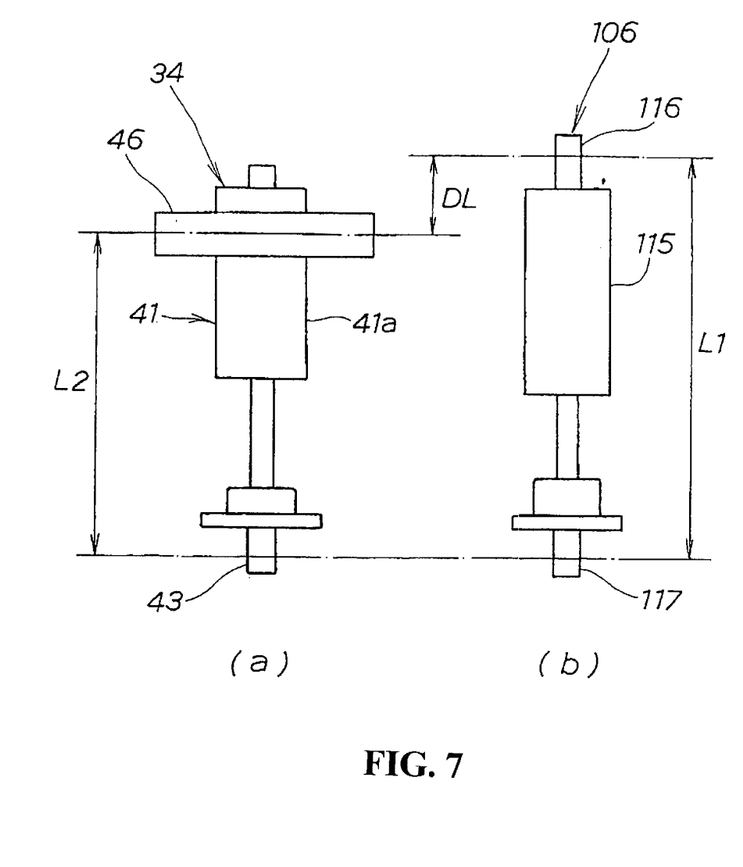
FIG. 7 is a schematic view explaining an operation of the rear suspension attachment structure of the present invention.

An explanation of the operation of the above-described rear suspension attachment structure will be provided hereinafter. FIG. 7 is a schematic view explaining an operation of the rear suspension attachment structure of the present invention. FIG. 7 includes operation views (a) and (b) explaining an operation of the rear suspension attachment structure through comparative example. In the embodiment of FIG. 7(a), an interval between a portion of the cylinder attachment member 46 attached to the swing arm and a portion of the lower attachment portion 43 attached to the link mechanism, is designated by notation L2. In the comparative example of FIG. 7(b), an interval between a portion of the first attachment portion 116 of the shock absorber 106 attached to the vehicle frame and a portion of the second attachment portion 117 of the shock absorber 106 attached to the first link member is designated by notation L1.

In FIG. 7, according to the present invention, the cylinder attachment member is attached to the side face 41a of the cylinder portion 41. In the comparative example of (b), the first attachment portion 116 is attached to the end portion of the cylinder portion 115. Therefore, the interval L2 according to the embodiment can be made shorter than the interval L1 according to the comparative example by a distance DL.

Further, although according to the above-described embodiment, in FIG. 1 through FIG. 3, the side face 41a of the cylinder portion 41 of the rear shock absorber 34 is attached to the swing arm 32 and the lower end attachment portion 43 of the rear shock absorber 34 is attached to the vehicle body side, (that is, the power unit 16) via the link mechanism 37, the side face 41a of the cylinder portion 41 may be attached to the vehicle body side. For example, the cylinder portion 41 may be attached to the power unit 16 via the link mechanism 37 and the lower end attachment portion 43 may be attached to the swing arm 32.

As has been explained as described above in reference to FIG. 1, FIG. 2 and FIG. 4, one end of the swing arm 32 is swingably attached to the pivotal shaft 31 provided at the power unit 16, the rear wheel 33 is attached to other end of the swing arm 32, the side face 41a of the cylinder portion 41 of the rear shock absorber 34 is attached to the swing arm 32 via the cylinder attachment member 46 and the lower end of the rear shock absorber 34 is connected to the power unit 16 via the link mechanism in a first embodiment.

By attachment of the side face 41a of the cylinder portion 41 of the rear shock absorber 34 to the swing arm 32 via the cylinder attachment member 46, an interval between the attachment portion of the rear shock absorber 34 on the side of the swing arm, e.g., cylinder attachment member 46, and the attachment portion of the shock absorber 34 on the side of the vehicle body, e.g., the lower end attachment portion 43, when the rear shock absorber 34 is attached between the swing arm 32 and the power unit 16 can be reduced. A new space can be formed in the area surrounding an end portion of the rear shock absorber 34.

Therefore, the degree of design freedoms of shape, dimension and attachment position of contiguous parts to the end portion of the rear shock absorber 34, e.g., the fuel tank 17, the seat 18, associated electrical equipment and the like, can be increased. Further, other parts such as an oil tank, a battery, electric equipment and the like can also be arranged at other locations or new/additional parts can be arranged at the area surrounding the end portion of the rear shock absorber 34.

By attaching the side face 41a of the cylinder portion 41 of the rear shock absorber 34 to the swing arm 32, a large space can be formed among a rear portion of the main frame 11 on an upper side of the swing arm 32. The vehicle body side provided with the fuel tank 17, the seat 18, the swing arm 32, a battery, and electric equipment and the like or other parts can be arranged in a concentrated area of the vehicle frame or body. Further, assembly is facilitated by the concentration of parts, space requirements are maximized as parts are arranged compactly, and the productivity and downsizing of the motorcycle 10 or vehicle can be achieved with the present invention. Parts can be made contiguous to the end portion of the rear shock absorber 34 arranged substantially at a central portion of the vehicle body, by the concentration of parts to the central portion of the vehicle body. In addition, weight is concentrated at the central portion of the vehicle body and the maneuverability of a vehicle for road racing or an off-road vehicle service can be further promoted.

The invention is secondly featured in that there is provided the screw portion 41b formed with the male screw at the side face 41a of the cylinder portion 41 screw coupled with the female portion 61a formed with the female screw at the cylinder attachment member 46. By screw-coupling the male screw portion 41b of the cylinder portion 41 to the female screw portion 61a of the cylinder attachment member 46, the cylinder portion 41 can be rotated by using a tool such as a spanner, a hexagonal wrench or the like.

Accordingly, the cylinder portion 41 can be moved in the direction of the extension of the cylinder axis relative to the cylinder attachment member 46, and the interval L2 between the cylinder attachment member 46 and the lower end attachment portion 43 of the rear shock absorber 34 can be adjusted when necessary.

Therefore, the position of the vehicle body side relative to the swing arm 32, for example, the height of the seat 18, can be changed and a change in physical configuration or personal preference of the rider can be accommodated. Further, for example, a minimum height above ground from the lower end of the power unit 16 to the ground's surface can be adjusted. When the minimum height above ground is increased, driving performance on rough roads can be promoted, particularly in an offroad vehicle.

Figure 8:
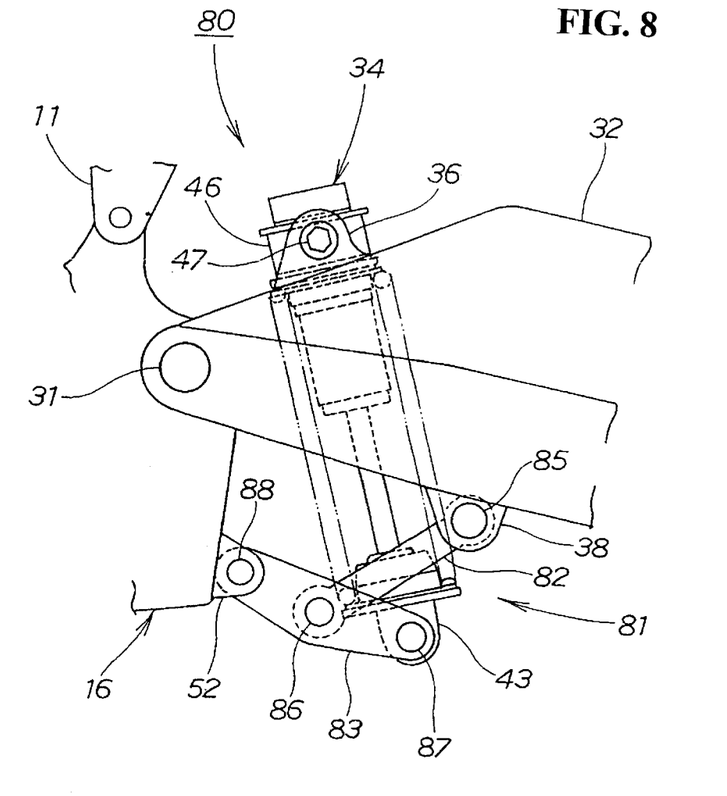
FIG. 8 is a side view of a portion of a rear suspension attachment structure according to a second embodiment of the present invention.

FIG. 8 is a side view of a portion of a rear suspension attachment structure according to a second embodiment of the present invention. FIG. 8 is a side view of a portion of a rear suspension attachment structure according to the second embodiment, wherein those elements that are the same as those in the first embodiment shown in FIG. 2 are provided with the same reference numerals. A detailed explanation of those elements common to both embodiments will be omitted hereinafter.

A rear suspension 80 includes the pivotal shaft 31, the swing arm 32, the rear shock absorber 34 and a link mechanism 81. The upper end of the rear shock absorber 34 is swingably attached to the upper brackets 36 of the swing arm 32 and the lower end of the rear shock absorber 34 is swingably attached to the link mechanism 81. The link mechanism 81 includes a first link 82, one end of which is swingably attached to the lower brackets 38 of the swing arm 32, and a second link 83, one end of which is swingably attached to the link attachment portion 52 of the power unit 16. An other end of the second link 83 is swingably attached to the lower end attachment portion 43 of the rear shock absorber 34 and a middle portion of is swingably attached to other end of the first link 82. Further, numeral 85 designates a first shaft, numeral 86 designates a second shaft, numeral 87 designates a third shaft, numeral 88 designates a power unit swing shaft. The third shaft 87 is arranged on a lower side of the second shaft 86 or at a height the same as that of the second shaft 86.

Figure 9:
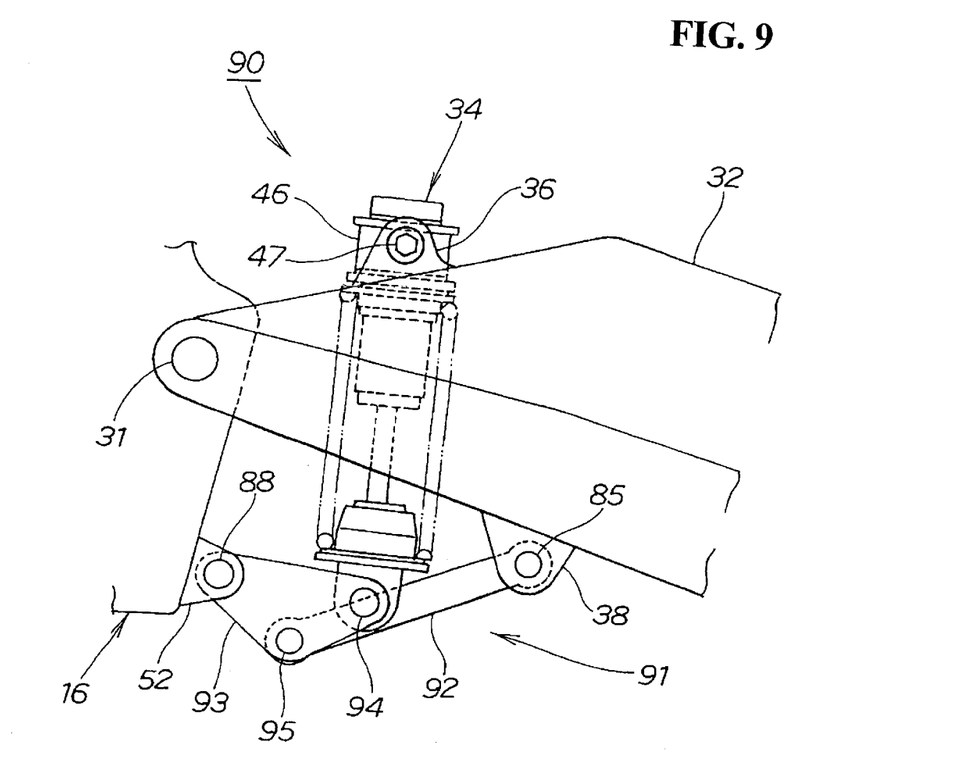
FIG. 9 is a side view of a portion of a rear suspension attachment structure according to a third embodiment of the present invention.

FIG. 9 is a side view of a portion of a rear suspension attachment structure according to a third embodiment of the present invention. A detailed description of common elements sharing the same elements and configurations as the above-mentioned embodiments will be omitted hereinafter.

A rear suspension 90 includes the pivotal shaft 31, the swing arm 32, the rear shock absorber 34 and a link mechanism 91. The upper end of the rear shock absorber 34 is swingably attached to the power brackets 36 and a lower end of the rear shock absorber 34 is swingably attached to the link mechanism 91.

The link mechanism 91 includes a first link 92, one end of which is swingably attached to the lower brackets 38 of the swing arm 32, and a second link 93 having a triangular shape, e.g., when viewed in a side view thereof. A first corner portion of the triangular shaped second link 93 is swingably attached to the link attachment portion 52 of the power unit 16. A second corner portion of the second link 93 is swingably attached to the lower end attachment portion 43 of the rear shock absorber 34. A remaining corner portion of the second link 93 is swingably attached to another end of the first link 92. Further, numeral 94 designates a second shaft, numeral 95 designates a third shaft. The second shaft 94 is arranged on an upper side of the third shaft 95. Further, although both of the spanner touch portions 67, 67 and the hexagonal hole 68 are provided in a preferred embodiment, either of the spanner touch portions 67, 67 and/or the hexagonal hole 68 may be provided in alternative arrangements.

The invention achieves following effects with the above-described embodiments. According to a rear suspension attachment structure of the present invention for a motorcycle, one end of a swing arm is swingably attached to a pivotal shaft provided on a side of a vehicle body and a rear wheel is attached to other end of the swing arm. A side face of a cylinder of a rear shock absorber is attached to the swing arm via an attachment member and a lower end of the rear shock absorber is connected to the side of the vehicle body. Accordingly, an interval between an attachment portion of the rear shock absorber on a side of the swing arm and an attachment portion thereof on a side of the vehicle body when the rear shock absorber is attached between the swing arm and side of the vehicle body can be reduced. A new space can also be formed at an area surrounding an end portion of the rear shock absorber.

Therefore, the degrees of freedom of shape, dimension and attachment positions of contiguous parts to the end portion of the rear shock absorber can be desirably increased. Further, additional/alternative parts can be arranged at the area surrounding the end portion of the rear shock absorber 34.

A male screw can be formed at the side face of the cylinder and coupled with a female screw portion formed at the attachment member. Accordingly, by rotating the cylinder, the cylinder can be moved in a direction of the extension of a cylinder axis relative to the attachment member. An interval between the attachment portion of the rear cushion on the side of the swing arm and the attachment portion of the rear cushion on the side of the vehicle body can be changed and a position on the side of the vehicle body can be moved upwardly and downwardly as desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear suspension attachment structure for a motorcycle having a vehicle body, said vehicle body including a rear wheel and a power unit, said rear suspension attachment structure comprising:

a swing arm having a first end and a second end, said first end being swingably attached to a pivotal shaft provided on said vehicle body and said second end being attached to said rear wheel;

a rear shock absorber having a cylinder and a lower end, said cylinder including a side face, said lower end of the rear shock absorber being connected to the side of the vehicle body; and an attachment member, said side face of said cylinder of said rear shock absorber being attached to the swing arm via said attachment member.

2. The rear suspension attachment structure according to claim 1, further comprising:

a male screw being formed at the side face of the cylinder; and a female screw being formed at the attachment member, said female screw being screw-coupled to the male screw.

3. The rear suspension attachment structure according to claim 2, said rear shock absorber further including
a cylinder portion having a cylinder,
a piston rod being attached to a piston movably contained in the cylinder portion,
a lower end attachment portion being provided at an end portion of the piston rod, and
a suspension spring being interposed between respective sides of the cylinder portion and the lower end attachment portion.

4. A rear suspension attachment structure for a vehicle comprising:
a swing arm, said swing arm having a generally trapezoidal shape with a middle portion, a first swing arm end and a second swing arm end;
a rear shock absorber having an upper end and a lower end;
at least one upper bracket for said swing arm, said upper end of said rear shock absorber being attached to the middle portion of the swing arm at said at least one upper bracket;
at least one lower bracket for said swing arm; and
a link mechanism being attached to said swing arm by said at least one lower bracket.

5. The rear suspension attachment structure according to claim 4, said rear shock absorber further including
a cylinder portion having a cylinder,
a piston rod being attached to a piston movably contained in the cylinder portion,
a lower end attachment portion being provided at an end portion of the piston rod, and
a suspension spring being interposed between respective sides of the cylinder portion and the lower end attachment portion.

6. The rear suspension attachment structure according to claim 5, further comprising a cylinder attachment member coupled to a side face of the cylinder portion.

7. The rear suspension attachment structure according to claim 6, wherein said cylinder attachment member is swingably attached to the at least one upper bracket of the swing arm.

8. The rear suspension attachment structure according to claim 5, further comprising a lower end attachment portion of said shock absorber being attached to the swing arm through the link mechanism.

9. The rear suspension attachment structure according to claim 7, further comprising upper attachment bolts forming a swing shaft of the cylinder attachment member.

10. The rear suspension attachment structure according to claim 9, further comprising a lower end attachment portion being attached to the swing arm through the link mechanism.

11. The rear suspension attachment structure according to claim 5, said link mechanism further including a first link and a second link, said first link having a triangular shape and swingably attached to the at least one lower bracket of the swing arm.

12. The rear suspension attachment structure according to claim 10, said link mechanism further including a first link and a second link, said first link having a triangular shape and swingably attached to the at least one lower bracket of the swing arm.

13. The rear suspension attachment structure according to claim 11, said second link including a first end swingably attached to the first link.

14. The rear suspension attachment member according to claim 6, said cylinder attachment member including a circular ring portion being provided at a center portion thereof and arm portions extending from the circular ring portion.

15. The rear suspension attachment member according to claim 14, said circular ring portion being coupled by screws to a side face of the cylinder portion, and said arm portions being attached to the at least one upper bracket of the swing arm by upper portion attachment bolts.

16. The rear suspension attachment structure according to claim 15, the cylinder attachment member being formed with a female screw portion and a large diameter hole having a diameter larger than an inner diameter of the female screw portion.

17. The rear suspension attachment structure according to claim 16, further comprising:
a male screw portion being screw-coupled to the female screw portion; and
a collar and a needle roller bearing rotatably attached to the upper attachment bolt by the at least one upper bracket, wherein an end portion of the collar is inserted into the large diameter hole.

18. The rear suspension attachment structure according to claim 17, the needle roller bearing including an outer ring and a plurality of needle rollers being provided on an inner side of the outer ring.

19. The rear suspension attachment member according to claim 5, said rear shock absorber including a plurality of spanner lands, a hexagonal hole, and a lock nut.

* * * * *